United States Patent
Tsutsui et al.

(10) Patent No.: US 6,963,324 B2
(45) Date of Patent: Nov. 8, 2005

(54) ACTIVE MATRIX DISPLAY DEVICE WITH SHARED RETAINING CIRCUIT

(75) Inventors: Yusuke Tsutsui, Hashima (JP); Ryoichi Yokoyama, Ogaki (JP); Shoichiro Matsumoto, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 107 days.

(21) Appl. No.: 09/988,227

(22) Filed: Nov. 19, 2001

(65) Prior Publication Data

US 2002/0060674 A1 May 23, 2002

(30) Foreign Application Priority Data

Nov. 17, 2000 (JP) ........................................ 2000-351250

(51) Int. Cl.⁷ .............................................. G09G 3/28
(52) U.S. Cl. ......................... 345/92; 345/214; 345/93; 345/97; 345/211
(58) Field of Search .................... 345/87–101, 204–214

(56) References Cited

U.S. PATENT DOCUMENTS

| | | | |
|---|---|---|---|
| 5,548,301 A | | 8/1996 | Kornher et al. |
| 5,712,652 A | | 1/1998 | Sato et al. |
| 5,745,088 A | * | 4/1998 | Kornher et al. ............... 345/85 |
| 5,945,972 A | | 8/1999 | Okumura et al. |
| 6,288,712 B1 | * | 9/2001 | Pinkham et al. ............ 345/204 |
| 6,456,267 B1 | * | 9/2002 | Sato et al. ..................... 345/92 |
| 6,518,945 B1 | * | 2/2003 | Pinkham ....................... 345/92 |

FOREIGN PATENT DOCUMENTS

| | | |
|---|---|---|
| EP | 1 020 840 A1 | 7/2000 |
| JP | 8-286170 | 11/1996 |
| JP | 11-260061 | 9/1999 |

* cited by examiner

Primary Examiner—Amr A. Awad
(74) Attorney, Agent, or Firm—Morrison & Foerster LLP (57) ABSTRACT

The switching between the normal operation mode and the memory operation mode is achieved by disposing one retaining circuit 110 for a plurality of pixel elements (for example, 2 or 4 pixel elements). The retaining circuit 110, which is a SRAM, requires considerable circuit space. The sharing of one retaining circuit by a plurality of the pixel elements enables the reduction of the seeming "number of the pixel elements" under the memory operation mode. This can lead to the size reduction of the pixel element, achieving the finer display under the normal operation mode. Also, the reduction in the number of the retaining circuits can further reduce the energy consumption under the memory operation mode, comparing to the case where the retaining circuit 110 is disposed for each of the pixel elements.

9 Claims, 8 Drawing Sheets

ACTIVE MATRIX DISPLAY DEVICE WITH SHARED RETAINING CIRCUIT

BACKGROUND OF THE INVENTION

Field of the Invention

This invention relates to an active matrix display device, especially to an active matrix display device having a plurality of retaining circuits provided for each of the pixel elements.

BACKGROUND OF THE INVENTION

There has been a great demand in the market for portable communication and computing devices such as a portable TV and cellular phone. All these devices need a small, light-weight and low-consumption display device, and development efforts have been made accordingly.

Figure 9:
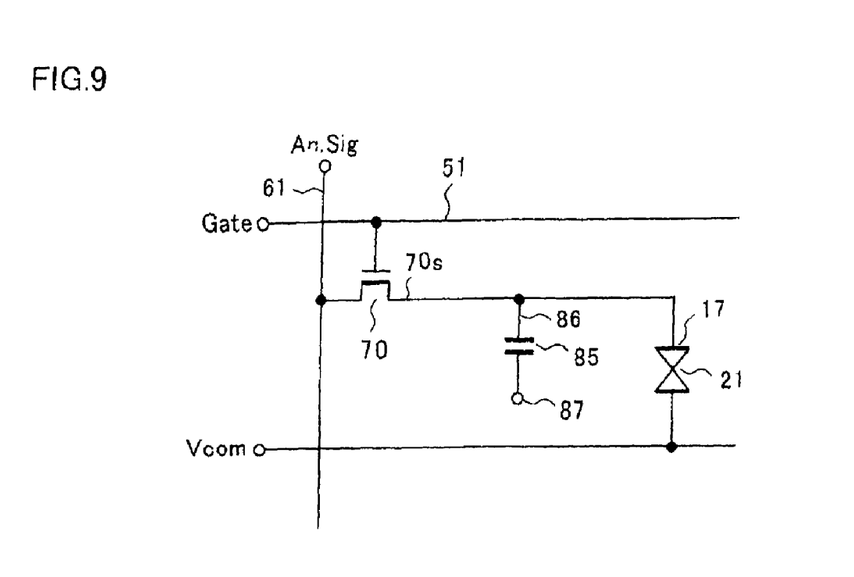
FIG. 9 is a circuit diagram of one pixel element of the liquid crystal display device.

FIG. 9 shows a circuit diagram corresponding to a single pixel element of a conventional liquid crystal display device. A gate signal line 51 and a drain signal line 61 are placed on an insulating substrate (not shown in the figure) perpendicular to each other. A selection pixel element selection TFT 70 connected to the two signal lines 51, 61 is formed near the crossing of the two signal lines 51, 61. The source 70s of the selection pixel element selection TFT 70 is connected to a pixel element electrode 17 of the liquid crystal 21.

A storage capacitor element 85 holds the voltage of the pixel element electrode 17 during one field period. A terminal 86, which is one of the terminals of the storage capacitor element 85, is connected to the source 70s of the selection pixel element selection TFT 70, and the other terminal 87 is provided with a voltage common among all the pixel elements.

When a gate signal is applied to the gate signal line 51, the selection pixel element selection TFT 70 turns to an on-state. Accordingly, an analog image signal from the drain signal line 61 is applied to the pixel element electrode 17, and the liquid crystal 21 through the pixel element electrode 17, and the storage capacitor element 85 holds the voltage. The voltage of the image signal is applied to the liquid crystal 21 through the pixel element electrode 17, and the liquid crystal 21 aliens in response to the applied voltage for providing a liquid crystal display image. By disposing the pixel elements as a matrix as described above, the LCD is achieved.

The conventional LCD is capable of showing both moving images and still images. There is a need for the display to show both a moving image and a still image within a single display. One such example is to show a still image of a battery within area in a moving image of a cellular phone display to show the remaining amount of the battery power.

Figure 6:
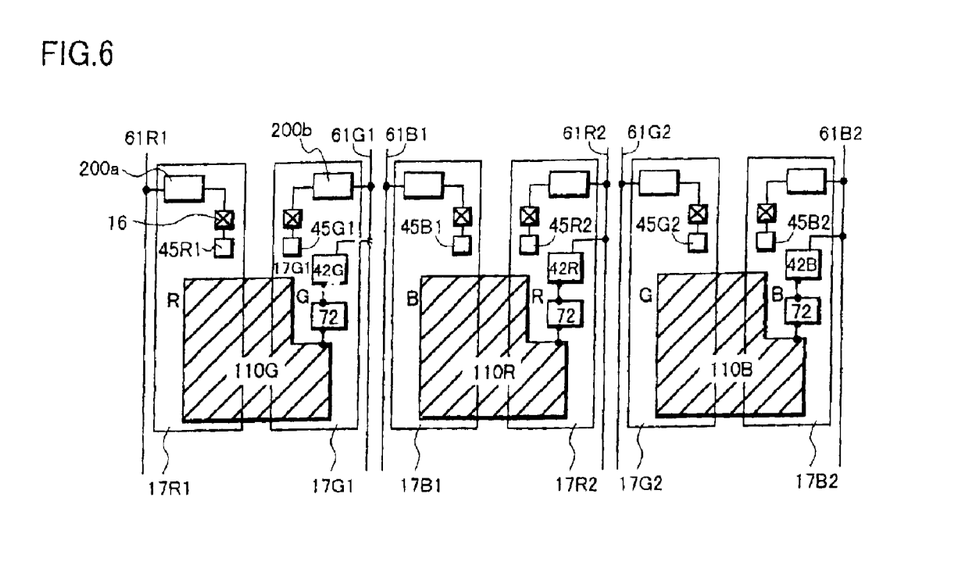
FIG. 6 is a schematic view showing the plan layout of the fourth embodiment of this invention.

However, the configuration shown in FIG. 6 requires a continuous rewriting of each pixel element with the same image signal at each scanning in order to provide a still image. This is basically to show a still-like image in a moving image mode, and the scanning signal needs to activate the selection pixel element selection TFT 70 by the gate signal at each scanning.

Accordingly, it is necessary to operate a driver circuit which generates a drive signal for the gate signals and the image signals, and an external LSI which generates various signals for controlling the timing of the drive circuit, resulting in a consumption of a significant amount of electric power. This is a considerable drawback when such a configuration is used in a cellular phone device, which has only a limited power source. That is, the time a user can use the telephone under one battery charge is considerably short.

Figure 10:
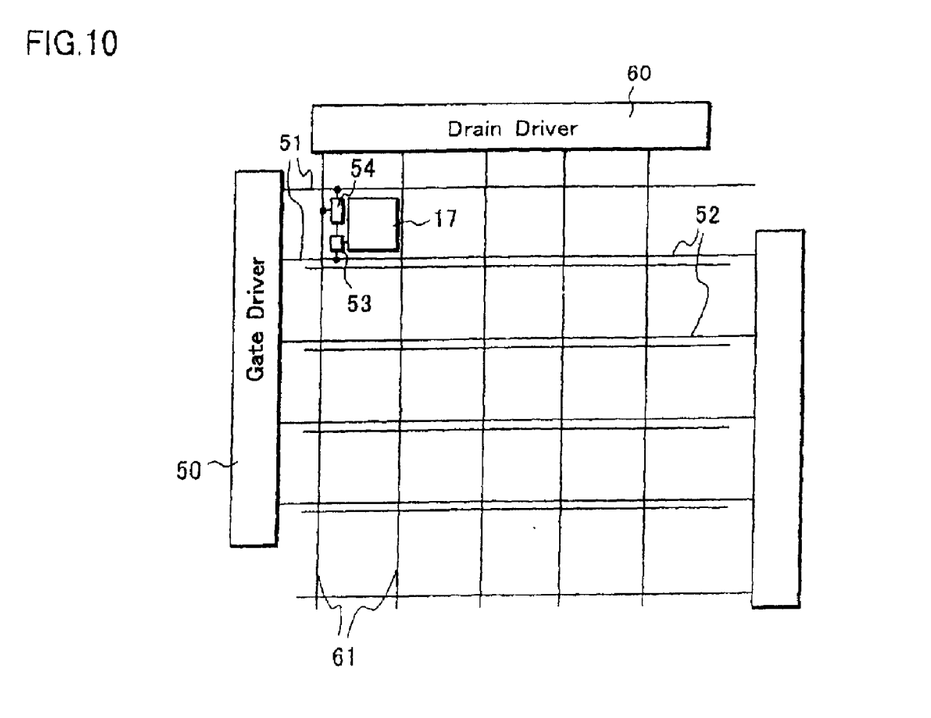
FIG. 10 is a circuit diagram of the conventional display device with a retaining circuit.

Japanese Laid-Open Patent Publication No. Hei 8-194205 discloses another configuration for display device suited for portable applications. This display device has a static memory for each of the pixel elements. FIG. 10 is a plan view showing the circuit diagram of the active matrix display device with a retaining circuit disclosed in Japanese Laid-Open Patent Publication No. Hei 8-194205. A plurality of gate signal lines 51 and reference lines 52 is disposed in a predetermined direction. And a plurality of drain lines 61 are disposed in the direction perpendicular to the predetermined direction. Between a retaining circuit 54 and a pixel element electrode 17, a TFT 53 is formed. By displaying image based on the data retained in the retaining circuit, the operation of a gate driver 50 and a drain driver 60 is stopped for the reduction of the electric power consumption.

Figure 11:
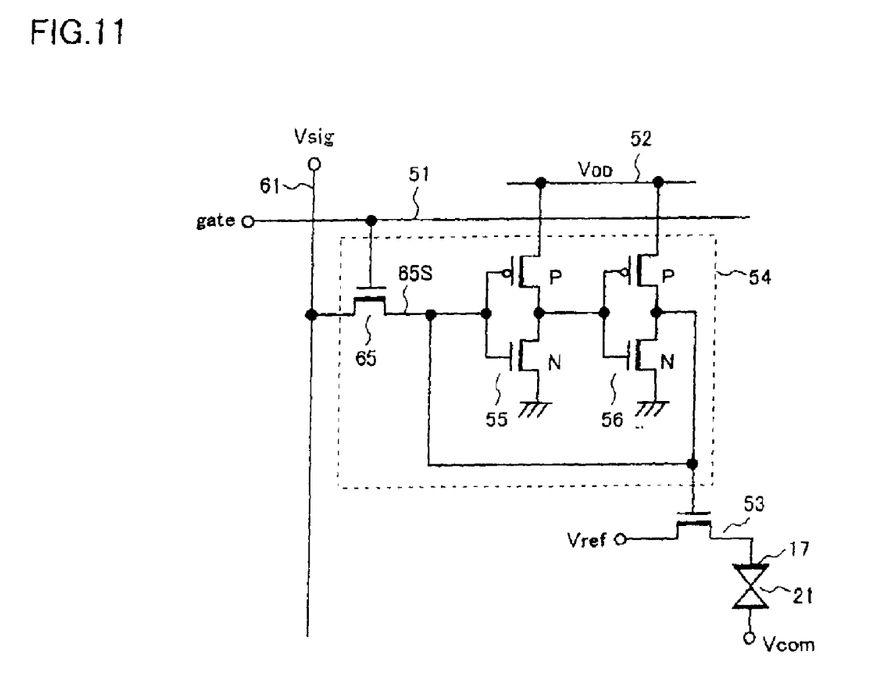
FIG. 11 is a circuit diagram of one pixel element of the conventional liquid crystal display device with a retaining circuit.

FIG. 11 shows a circuit diagram corresponding to a single pixel element of the liquid crystal display device. On a substrate, the pixel element electrode is deposed in a matrix. configuration. Between the pixel element electrodes 17, the gate signal line 51 and the drain signal line 61 are placed perpendicular to each other. The reference line 52 is disposed parallel to the gate signal line 51, and the retaining circuit 54 is formed near the crossing of the gate signal line 51 and the drain signal line 61. A switching element 53 is formed between the retaining circuit 54 and the pixel element electrode 17. A static memory (Static Random Access Memory: SRAM), in which two inverters INV1 and INV2 are positively fed back to each other, works as the retaining circuit for holding the digital image signal. Since the SRAM dose not need to refresh the memory for retaining the data, the SRAM, which is different from DRAM, is suitable for the display device.

In this configuration, the switching element 53 controls the resistance between a reference line and a pixel element electrode 17 in response to the divalent digital image signal held by the static memory and outputted from the retaining circuit in order to adjust the biasing of the liquid crystal 21. The common electrode, on the other hand, receives an AC signal Vcom. Ideally, this configuration does not need refreshing the memory when the image stays still for a period of time.

However, when a static RAM is used in the retaining circuit 54, the number of the required transistors of the retaining circuit is 4 or 6, resulting in an increased size of the circuit. Also, if the static RAM is placed between the pixel element electrodes 17, the area for the pixel element electrode is reduced. Thus, in such a case, the light manipulation area of the liquid crystal display device is limited, and it is difficult to reduce the size of the display device of a large pixel element.

SUMMARY OF THE INVENTION

This invention is directed to the high quality display of an active matrix display device, especially under the normal operation mode, in the display device with a retaining circuit.

The active matrix display device of this invention has a plurality of pixel element electrodes disposed in matrix configuration and a plurality of retaining circuits disposed for the pixel element electrodes. The active matrix display device is operated under two modes, the normal operation mode, where the pixel element voltage corresponding to the consecutively inputted image signal is consecutively applied to the pixel element electrode, and the memory mode, where the display is based on the data stored in the retaining circuit. One retaining circuit is disposed for a plurality pixel elements, and the output of the retaining circuit is supplied to a plurality of the pixel element electrodes. For example, one retaining circuit is disposed for every two pixel elements, and the output of the retaining circuit is supplied to two pixel element electrodes. Or, one retaining circuit is disposed for every four pixel elements, and the output of the retaining circuit is supplied to four pixel element electrodes.

In the above configuration, the retaining circuit that requires considerably large circuit space is shared by a plurality of pixel elements. Thus, the packing density of the pixel elements becomes higher, leading to the size reduction of the display device.

Also, the active matrix display device of this invention has a plurality of pixel element electrodes disposed in matrix configuration and a plurality of retaining circuits disposed for the pixel element electrodes. In the active matrix display device operated under two modes, the normal operation mode, where the pixel element voltage corresponding to the consecutively inputted image signal is consecutively applied to the pixel element electrode, and the memory mode, where the display is based on the data stored in the retaining circuit, the number of the retaining circuits is relatively small compared to the number of the pixel element electrodes. For example, the number of the retaining circuits is ½ of the number of the pixel element electrodes. Or the number of the retaining circuits is ¼ of the number of the pixel element electrodes.

In the above configuration, the number of the retaining circuit that requires considerably large circuit space is relatively small. Thus, the packing density of the pixel elements becomes higher, leading to the size reduction of the display device.

Also, the active matrix display device of this invention has a plurality of pixel element electrodes disposed in matrix configuration and a plurality of retaining circuits disposed for the pixel element electrodes. In the active matrix display device operated under two modes, the normal operation mode, where the pixel element voltage corresponding to the consecutively inputted image signal is consecutively applied to the pixel element electrode, and the memory mode, where the display is based on the data stored in the retaining circuit, the number of the pixel elements for display under the memory mode is smaller than the number of the pixel elements for display under the normal operation mode. For example, the number of the pixel elements for display under the memory mode is ½ of the number of the pixel elements for display under the normal operation mode. Or the number of the pixel elements for display under the memory mode is ¼ of the number of the pixel elements for display under the normal operation mode.

In the configuration stated above, the packing density of the pixel elements becomes higher, leading to the size reduction of the display device.

Also, in the configuration stated above, the retaining circuit may be a multiple bit memory that can hold more than 3-value data. Generally, when the retaining circuit is made as multiple bit memory, the circuit size increases. Therefore, this invention, where one retaining circuit is shared by a plurality of pixel elements, can effectively reduce the size of the display device with the multiple bit memory retaining circuit.

DESCRIPTION OF THE INVENTION

Figure 1:
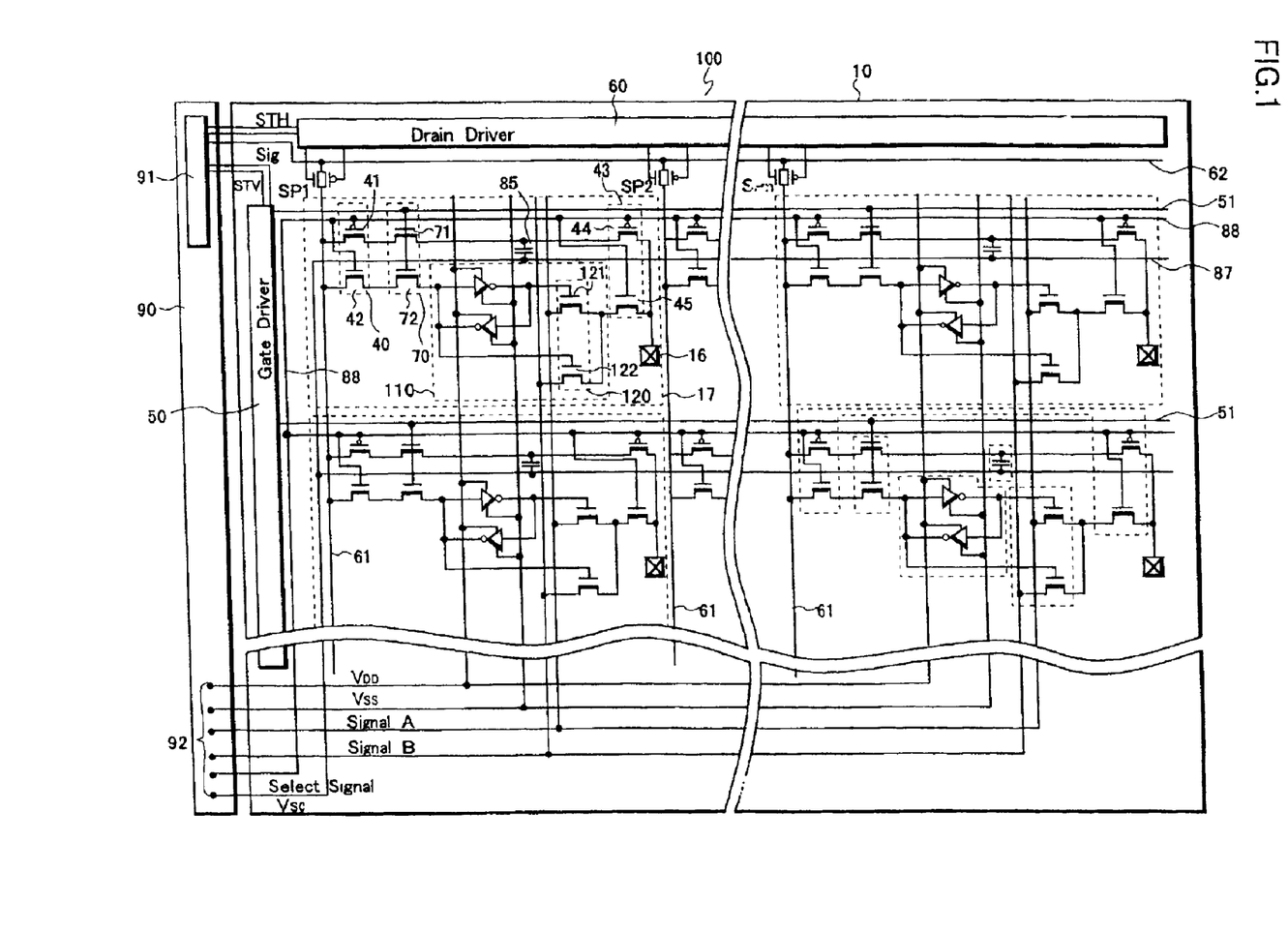
FIG. 1 is a circuit diagram showing the first embodiment of this invention.

Next, the display device relating to the embodiment of this invention will be explained. FIG. 1 shows a circuit diagram of a liquid crystal device to which the display device of this invention is applied.

In a liquid crystal display panel 100, a plurality of pixel element electrodes 17 are disposed in a matrix configuration on an insulating substrate 10. A plurality of gate signal lines 51 connected to a gate driver 50 for providing gate signals are aligned in one direction. A plurality of drain signal lines 61 are aligned in the direction perpendicular to the direction of the gate signal lines 51.

Sampling transistors SP1, SP2, , , SPn turn on in response to the timing of the sampling pulse fed from the drain driver 60, and connect the drain signal lines 61 to the data signal lines 62 carrying the data signal, which is the digital image signal or the analog image signal.

The gate driver 50 selects and feeds the gate signal to one of the gate signal lines 51. And the pixel element electrode 17 of the selected line receives the data signal fed from the drain signal line 61.

The detail of the configuration of each of the pixel elements will be explained below. A circuit selection circuit 40 having a P-channel circuit selection TFT 41 and a N-channel circuit selection TFT 42 is placed near the crossing of the gate signal line 51 and the drain signal line 61. The drains of circuit selection TFTs 41, 42 are connected to the drain signal line 61 and the gates of the two circuit selection TFTs are connected to the circuit selection signal line 88. One of the two circuit selection TFTs 41,42 turns on in response to a selection signal fed from the circuit selection signal line 88. The circuit selection circuit 43 comprising a P-channel circuit selection TFT 44 and a N-channel circuit selection TFT 45 is provided to cooperate with the circuit selection circuit 40. The transistors of the circuit selection circuits 40 and 43 need to operate complimentarily, and the P-channel and the N-channel can be reversed. It is possible to omit one of the circuit selection circuits 40 and 43.

A pair of the two circuit selection circuits 40 and 43 enables the switching between the analog image display (full color moving image) which is the normal operation mode and the digital image display (still image and low energy consumption), which is the memory mode. A pixel element selection circuit 70 having a N-channel pixel element selection TFT 71 and a N-channel TFT 72 is placed next to the circuit selection circuit 40. The pixel element selection TFTs 71, 72 are connected to the circuit selection TFTs 41, 42 of the circuit selection circuit 40, and both gates of the TFTs 71, 72 are connected to the gate signal line 51. Both of the pixel element selection TFTs 71, 72 turn on at the same time in response to the gate signal fed from the gate signal line 51. It is possible to place the pixel element selection circuit 70 between the drain signal line 61 and the circuit selection circuit 40. In such a configuration, it is possible to replace the pixel element selection TFTs 71, 72 by a single TFT.

A storage capacitor element 85 holds the analog image signal in the analog mode. One of the electrodes of the storage capacitor element 85 is connected to the source of the pixel element selection TFT 71. Another electrode is connected to a common storage capacitor line 87 carrying a bias voltage Vcs. Also, the source of the pixel element selection TFT 71 is connected to the pixel element 17 through the circuit selection TFT 44 and the contact 16. After the opening of the gate of the pixel element selection TFT 70 by the gate signal, the analog image signal fed from the drain signal line 61 is inputted to the pixel element electrode 17 through the contact 16, and applied to drive the liquid crystal 21 as the pixel element voltage. The pixel element voltage should be retained during one field period after the selection by the pixel element selection TFT is lifted. However, with only the capacity of the liquid crystal, the pixel element voltage of the applied signal can not be retained even during one field period, resulting in a loosing of the homogeneity of the displayed image. The storage capacitor element 85 maintains the applied voltage at the initial level during one field period for eliminating the problem above.

A P-channel TFT 44 of the circuit selection circuit 43 is placed between the storage capacitor element 85 and the pixel element electrode 17, and turns on and off in synchronization with the switching of the circuit selection TFT 41 of the circuit selection circuit 40. The operation mode, under which the circuit selection TFT 41 is on and in which the analog signal is successively applied to drive the liquid crystal, is called as the normal operation mode or the analog operation mode.

A retaining circuit 110 is placed between the TFT 72 of the pixel element selection circuit 70 and the pixel element electrode 17. The retaining circuit 110 has two inverter circuits, which are positively fed back to each other, and the signal selection circuit 120 and forms a static memory of digital divalent.

The signal selection circuit 120 has two N-channel TFTs 121, 122, and selects a signal in response to the signal fed from the two inverters. Since two complementary output signals from the two inverters are applied to the gates of the two TFTs 121, 122, respectively, only one of the two TFTs 121, 122 turns on at a time.

The AC drive signal Vcom (signal B) is selected when the TFT 122 turns on, and the AC drive signal (signal A), which is equal to the common electrode signal Vcom, is selected when the TFT 121 turns on. The selected signal is then applied to the pixel element electrode 17 of the liquid crystal 21 through the TFT 45 of the circuit selection circuit 43. The operation mode, under which the circuit selection TFT 42 is on and in which image is displayed based on the data retained in the retaining circuit, is called as the memory mode or the digital operation mode.

In summary, there is provided two kinds of circuits; the circuit (the analog display circuit) comprising the pixel element selection element TFT 71 and the storage capacitor element for holding analog image signal, and the circuit (the digital display circuit) comprising the pixel element selection element TFT 72 and the retaining circuit 110 for holding divalent digital image signal in single pixel element. There is also provided the circuit selection circuits 40, 43 for selecting the circuit.

The liquid crystal display panel 100 has peripheral circuit as well. A panel drive LSI 91 is mounted on an external circuit board 90 retrofitted to the insulating substrate 10 of the liquid crystal panel 100, and sends the vertical start signal STV and the horizontal start signal STH to the gate driver 50 and the drain driver 60 respectively. The panel drive LSI also feeds the image signal to the data line 62.

Next, the driving method of the display device with above configuration is explained.

(1) Normal Operation Mode (Analog Operation Mode)

When the analog display mode is selected in response to the display mode selection signal, the LSI 91 feeds the analog image signal to the data line 62, and the voltage applied to the circuit selection signal line 88 changes to L so that the circuit selection TFTs 41, 44 of the circuit selection circuits 40, 43 turn on, and the circuit selection TFTs 42 and 45 turn off.

The sampling transistor SP successively turns on in response to the sampling signal based on the horizontal start signal STH so that the analog image signal is provided to the drain signal line 61 through the data signal line 62.

The gate signal is provided to the gate signal line 51 in accordance with the vertical start signal STV. When the pixel element selection TFT 71 turns on in response to the gate signal, the analog image signal An. Sig is applied, through the drain signal line 61, to the pixel element electrode 17 and the storage capacitor element 85, which holds the applied voltage. The image signal voltage applied to the pixel element electrode 17 is then applied to the liquid crystal 21, which aligns itself in accordance with the voltage, resulting in a display image.

This analog display mode is suitable for showing a full color moving image because the image signal voltage is successively inputted. However, the external LSI 91 on the retrofitted circuit board 90, and drivers 50, 60 continuously consume the electric energy for driving the liquid crystal display device.

(2) Memory Mode (Digital Display Mode)

When the digital display mode is selected in response to the display mode selection signal, the LSI 91 is set to convert the image signal to the digital signal, extract the highest-bit digital signal and output it to the data signal line 62. At the same time, the voltage of the circuit selection signal line 88 turns to H. Then, the circuit selection TFTs 41, 44 of the circuit selection circuits 40, 43 turn off and the TFTs 42, 45 turn on. Thus, the retaining circuit 110 becomes operable.

The panel drive LSI 91 on the external circuit board 90 sends start signal STH to the gate driver 50 and the drain driver 60. In response to the start signal, sampling signals are sequentially generated and turn on the respective sampling transistors SP1, SP2, , , SPn sequentially, which sample the digital image signal D. Sig and send it to each of the drain signal lines 61.

Now, the operation of the first row of the matrix, or the gate signal line 51, which receives the gate signal, G1, will be described below. First, the gate signal GI turns on each pixel element selection TFT 72 of each of the pixel elements connected to the gate signal line 51, for one horizontal scanning period. In the pixel element located at the upper left corner of the matrix, the sampling transistor SP1 takes in the digital signal S11 and feeds it to the drain signal line 61. The pixel element selection TFT 72 turns on in response to the gate signal, and the digital signal D. Sig is inputted to the retaining circuit 110 and retained by the two inverters.

The signal retained by the inverters is then fed to the signal selection circuit 120, and is used by the signal selection circuit 120 to select one of the signal A and signal B. The selected signal is then applied to the liquid crystal 21 through the pixel element electrode 17.

Thus, after a completion of a scanning from the first gate signal line 51 on the top row of the matrix to the last gate signal line 51 on the bottom row of the matrix, a full display frame scan (one field scan), or a full dot scanning, is completed and the display device shows an image.

When the display device shows an image, the voltages supplied to the gate driver 50, the drain driver 60 and the external panel drive LSI 91 are stopped for halting the drive. The voltages Vdd, Vss are always supplied to the retaining circuit 110 for driving. Also, the common electrode voltage is supplied to the common electrode 32 and each of the signals A and B is supplied to the selection circuit 120.

When the voltages Vdd, Vss are supplied to the retaining circuit 110 and the common electrode voltage Vcom is applied to the common electrode 32, and when the liquid crystal display panel 100 is in a normally-white (NW) mode, the signal A receives the AC drive voltage which is the same voltage as the common electrode voltage and the signal B receives only the AC drive voltage (for example, of 60 Hz) for driving the liquid crystal. Accordingly, it is possible to hold the data and display one still image. Here, the voltage is not applied to the gate driver 50, drain driver 60 and external LSI 91.

When the retaining circuit 110 receives the digital image signal of H through the drain signal line 61, the first TFT 121 of the signal selection circuit 120 receives a L signal and accordingly turns off, and the second TFT 122 receives a H signal and turns on. In this case, the signal B is selected and the liquid crystal 21 receives the signal B having a phase opposite to the signal A, resulting in the rearrangement of the liquid crystal 21. Since the display panel is in a NW mode, a black image results.

When the retaining circuit 110 receives the digital image signal of L through the drain signal line 61, the first TFT 121 of the signal selection circuit 120 receives a H signal and accordingly turns on, and the second TFT 122 receives a L signal and turns off. In this case, the signal A is selected and the liquid crystal 21 receives the signal A, which is the same as the signal A applied to the common electrode 32. As a result, there is no change in the arrangement of the liquid crystal 21 and the pixel element stays white.

In this way, by writing and holding the data for displaying one image display, it is possible to display the data as a still image. In this case, each of the drivers 50, 60 and the LSI 91 stop their drive resulting in the reduction of the electric power consumption.

In the above embodiment, one bit digital signal is retained in the retaining circuit 110. However, if the retaining circuit is made compatible to the multiple bit, it is possible have multiple level display under the memory mode. Also, if the retaining circuit is made as the memory device capable of retaining the analog value, it is also possible to have a full color display under the memory mode As described above, the embodiment of this invention is capable of corresponding to the two kinds of display, a fill color moving picture display (analog display mode), for which data is successively fed, and a digital level display (digital display mode) of low energy consumption within single liquid crystal display panel 100.

Figure 2:
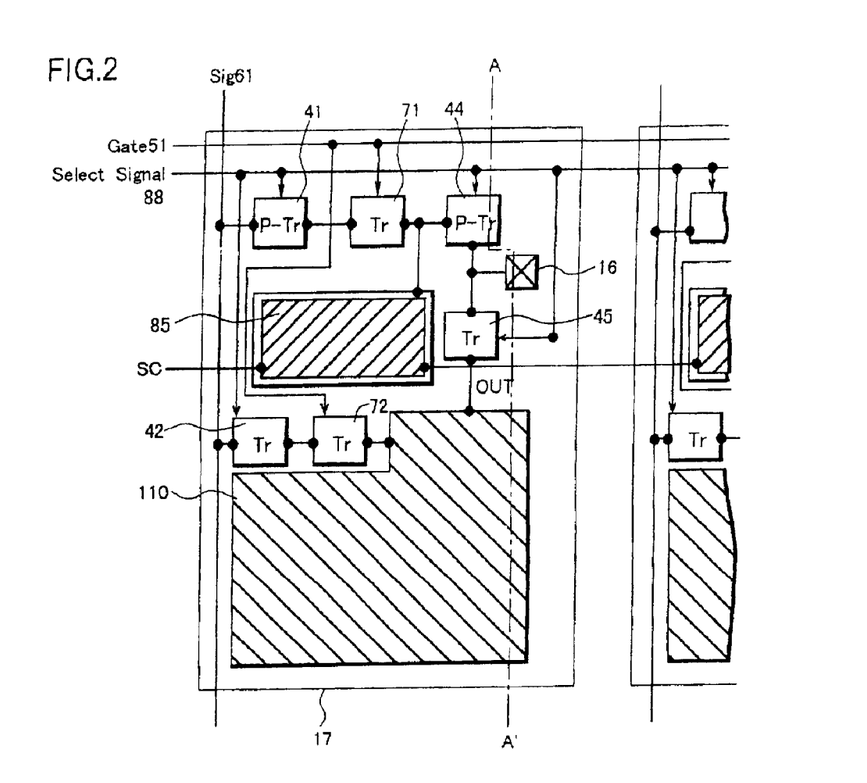
FIG. 2 is a schematic view showing the plan layout of the first embodiment of this invention.

Next, the layout of the embodiment will be explained by referring to FIG. 2. FIG. 2 is a schematic view showing the layout of the embodiment. The circuit selection P-channel TFT 41 of the circuit selection circuit, the pixel element selection TFT 71 of the pixel element selection circuit and the P-channel TFT 44 of the circuit selection circuit are connected in series. They are also connected to the pixel element electrode 17 through the contact 16 and to the storage capacitor element 85. Also, the depiction of each of the power lines connected to the retaining circuit 110 is omitted. In this embodiment, the retaining circuit 110 is disposed for each of the pixel elements.

Figure 3:
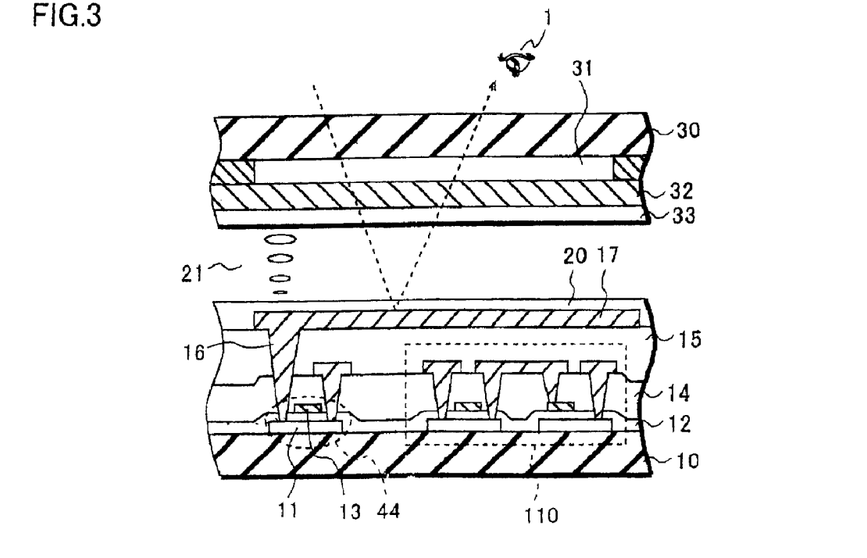
FIG. 3 is a cross-sectional view of the embodiment of this invention.

The LCD of this embodiment is a reflection-type LCD. FIG. 3 shows a cross section along the A–A' line of FIG. 2 of the reflection-type LCD of the embodiment.

The reference numeral 10 is an insulating substrate on one side of the display device, and the element denoted by the reference numeral 11 is an isolated polysilicon semiconductor layer 11 on the substrate 10. A gate insulating film 12 is formed on top of the polysilicon semiconductor layer 11, and a gate electrode 13 is formed on the portion of the insulating film 12 corresponding to the polysilicon semiconductor layer 11. A source and a drain are formed in the semiconductor layer 11 at the portions located at both sides of the gate electrode 13. As the interlayer insulating film 14 is deposited above the gate electrode 13 and the gate insulating layer 12. Contacts are formed at the portions of the interlayer insulating film 14 corresponding to the drain and the source. The drain is connected to a pixel element selection TFT 71 through the contact, and the source is connected to a pixel element electrode 17 through the contact 16. The pixel element electrode 17 is formed on the flattening insulating film 15 and is made of a reflecting electrode material, for example, aluminum (Al). An orientation film 20 is formed on the pixel element electrode 17 and the flattening insulating film 15. The orientation film 20 is made of polyimid and aligns the liquid crystal 21.

The insulating substrate 30 on the other side of the display device has color filter 31 for generating red (R), green (G), and blue (B) colors, a common electrode 32 made of a transparent electrode material such as ITO (indium tin oxide), and an orientation film 33 for aligning the liquid crystal 21. When the image is not shown in color display, the color filter 31 is not necessary.

The liquid crystal 21 fills the gap between the two insulating substrates 10, 30, which are attached together by sealing the peripheral portions of the two insulating substrates with a sealing adhesive.

In the reflection-type LCD, the light coming from the insulating substrate 30 side is reflected by the pixel element electrode 17 so that the observer 1 recognizes the light modulated by the liquid crystal 21 of the display device.

Next, the second embodiment of this invention will be explained. In general, there is a demand to increase the number of pixel elements or to reduce the size of the device with keeping the number of the pixel elements for the fine display. However, as shown in the first embodiment, the retaining circuit 110 is a SRAM. The SRAM is configured from the combination of a plurality of TFTs, and its driving voltage is relatively low. Thus, the SRAM is suitable to be formed on the glass substrate of the display device along with the driver circuit. On the other hand, the number of the required transistors for one SRAM is 4 to 6, which requires a certain amount of the circuit space. Therefore, if the retaining circuit 110 is disposed for each of the pixel elements, the pixel element pitch should be at least as large as the retaining circuit 110. It would be several times larger than the ordinary pixel element pitch of the ordinary display device with no retaining circuit 110. However, in this embodiment, one retaining circuit is disposed for a plurality of the pixel element, leading to the size reduction.

Figure 4:
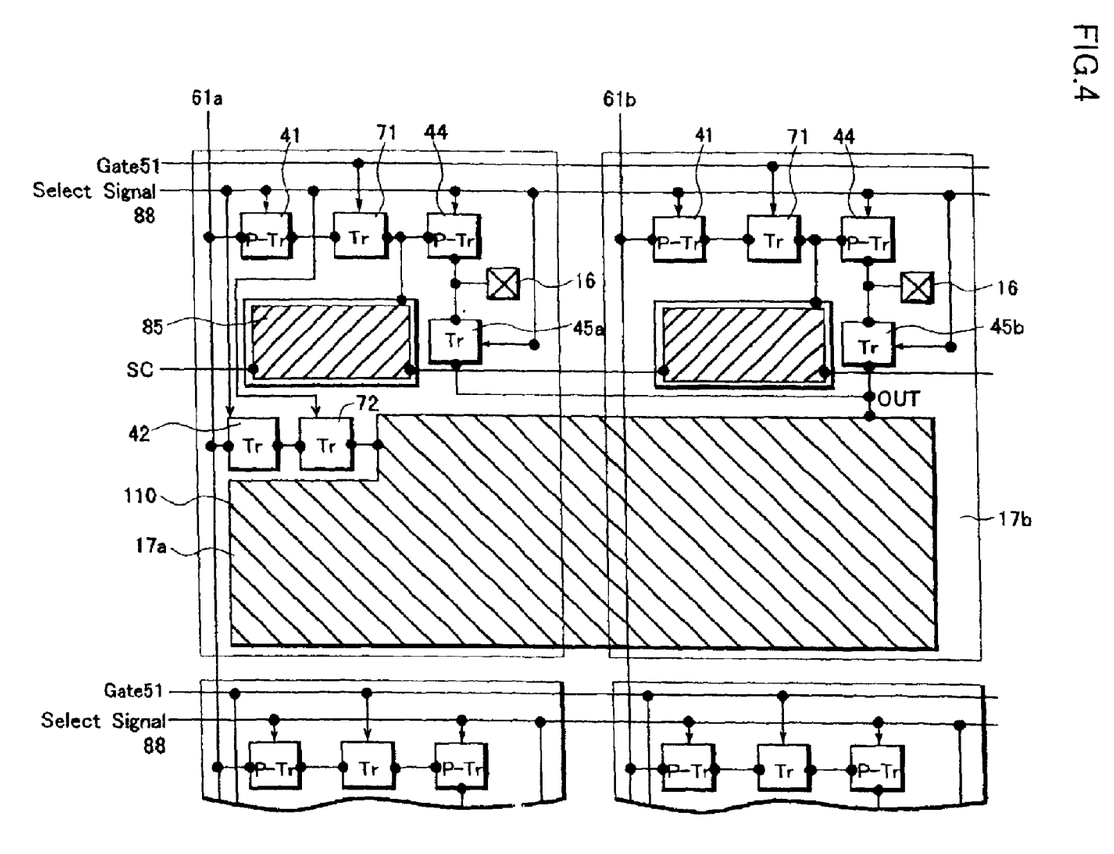
FIG. 4 is a schematic view showing the plan layout of the second embodiment of this invention.

FIG. 4 is a schematic view showing the layout of this invention. In the figure, two pixel elements corresponding to the pixel element electrodes 17a and 17b are shown. To each of the pixel element electrodes 17a and 17b, the circuit selection TFT41, pixel element selection TFT71, and circuit selection TFT44 are connected in series along with the storage capacitance element 85. The above configuration is exactly the same as that of the first embodiment. This configuration will be called as the normal operation circuit, in some cases hereinafter. The display is made at each of the pixel elements by the normal operation circuit under the normal operation mode (analog operation mode). From the drain signal line 61 disposed for each column, the image signals corresponding to each of the pixel elements are inputted to pixel element electrodes 17a and 17b, making display at each of the pixel elements.

A feature of this embodiment is that one retaining circuit 110 is disposed for two pixel elements, which share the retaining circuit 110. This will be explained in detail hereinafter.

The retaining circuit 110 is connected to the drain signal line 61 a through the circuit selection circuit TFT 42, and the image signal outputted from the retaining circuit 110 is inputted to the pixel element electrodes 17a and 17b through the circuit selection circuits 45a and 45b, respectively. As explained in the first embodiment, the output of the retaining circuit is outputted through the signal selection circuit 120. The retaining circuit 110 is not connected to the drain signal line 61b, which supplies the image signal to the pixel element electrode 17b under the normal operation mode. Also, the drain driver 60 not shown in the figure outputs signals alternately to the drain signal lines 61. Also, the outputted image signal is the signal corresponding to the intermediate value of the two image signals from two drain signal lines 61.

That is, under the memory mode (digital display mode), the intermediate image signal of the signals supplied to the pixel element electrodes 17a, 17b under the normal operation mode is commonly applied to these two pixel element electrodes. Thus, the drain signal line 61b does not receive anything, making the pixel element electrodes 17a, 17b act as a single pixel element. By making two pixel elements act like one pixel element in this way, "the number of the pixel elements" is practically reduced.

In this embodiment, the retaining circuit 110 that requires circuit space is shared by two pixel elements, leading to the higher circuit integration and the size reduction of the display device. The number of the SRAM, especially the number of the columns operating under the memory operation mode is ½ of the number of pixel elements operating under the normal operation mode. Thus, it is possible to further lower the driver frequency of the drain driver 60. Since the number of SRAM is smaller compared to the first embodiment where the SRAM is provided for each pixel element, the number of SRAM requiring the writing upon the transition to the memory operation mode is also small. And the leakage of the electric current from the SRAM under the memory operation mode is small, leading to the further reduction of the energy consumption.

Figure 5:
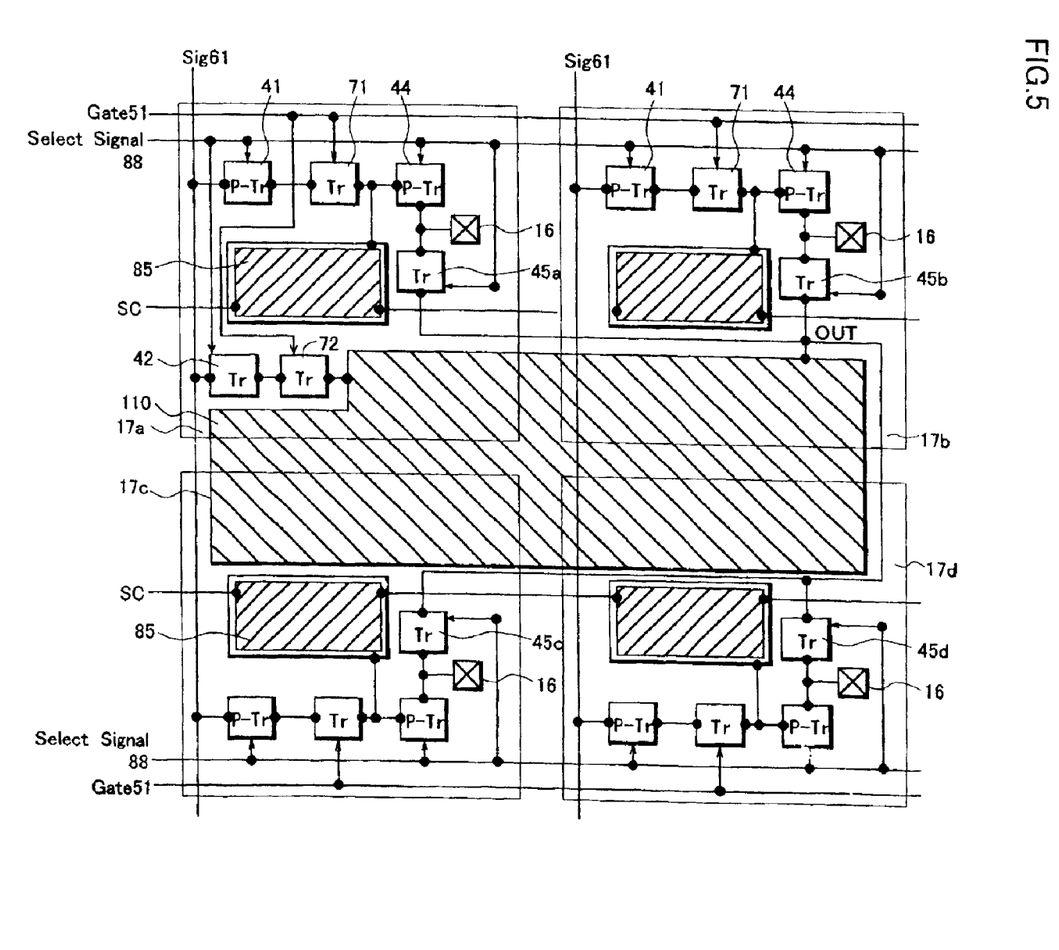
FIG. 5 is a schematic view showing the plan layout of the third embodiment of this invention.

Next, the third embodiment of this invention will be explained. FIG. 5 is a schematic view showing the layout of this invention. In FIG. 5, four pixel elements are shown. To the each of the pixel element electrodes 17a, 17b, 17c, and 17d, the circuit selection TFT 41, the pixel element selection TFT 71, the circuit selection TFT 44 and the storage capacitance element 85, which configure the normal operation circuit, are placed.

A feature of the third embodiment is that the retaining circuit 110 is shared by four pixel elements. The output from the retaining circuit 110 is fed to the pixel element electrodes 17a, 17b, 17c and 17d through the circuit selection TFTs 45a, 45b, 45c, and 45d respectively. Since other conditions are the same as the first and second embodiments, the redundant explanation will be omitted.

In this embodiment, the circuit selection TFTs 41, the pixel element selection TFTs 71, the circuit selection TFTs 44, 45, and the storage capacitance elements 85 of the pixel elements aligned in the first and second columns in the figure are symmetrically disposed with the axis of the symmetry between the columns. Thus, at the side of the symmetry axis of each of the pixel elements, the space is reserved for the retaining circuit 110.

Also in this embodiment, under the normal operation mode, display is made for each of the pixel elements by using the normal operation circuit. Under the memory operation mode, display is made by making four pixel elements act as one pixel element reducing the practical number of the pixel elements. In this embodiment, the number of the retaining circuit disposed for each of the pixel elements is about ¼, and thus, the area required for the retaining circuit per one pixel element is relatively small. Therefore, compared to the second embodiment, the circuit integration can be made higher, leading to the further size reduction. And, it is possible to supply a fine display under the normal operation mode, and to provide a display with low energy consumption under the memory operation mode. Also, the number of the SRAM operating under the memory operation mode is about ¼ of the number of pixel elements operating under the normal operation mode. It is not only possible to reduce the operation frequency of the drain driver as in the second embodiment, but it is also possible to reduce the operation frequency of the gate driver 50 because the number of the gate signal lines 51 for scanning is also reduced to ½. Therefore, the energy consumption under the memory operation mode can be further reduced compared to the second embodiment.

Next, the forth embodiment of this invention will be explained. FIG. 6 is a schematic view showing the layout of this invention. This embodiment is the display device for color image display. In the color display device, the pixel elements for three colors of R, G, B, for example, are used as one picture element. FIG. 6 shows two picture elements, that is, six pixel elements. In order to differentiate the configuration of each of the picture elements and pixel elements, the pixel elements R, G, B corresponding to the first picture element are denoted as R1,G1, and B1, and those for the second picture element are referred to as R2, G2, and B2 hereinafter.

For each pixel element, one of the six pixel element electrodes, 17R1, 17G1, 17B1, 17R2, 17G2 and 17B2 and the normal operation circuit 200 connected to the pixel element electrode are placed. The normal operation circuit comprises the circuit selection TFT 41, the pixel element selection TFT 71, the circuit selection TFT 44, and storage capacitance element 85, and has the same configuration as the aforementioned embodiments. However, it is shown as the normal operation circuit 200 here, for the sake of the simplification of the figure. For every two pixel elements, one of the retaining circuits 110R, 110G, and 110B is disposed. The retaining circuit 110R disposed for the two pixel elements in the center of the figure holds the data corresponding to the red image signal. The retaining circuit 110R is connected to the drain signal line 61R2 through the TFT 42R. The output from the retaining circuit 110R is supplied to the pixel element electrodes 17R1 and 17R2, corresponding to the Rs located at the left side and in the center of the figure, through TFT 45R1 and 45R2 respectively. The depiction of the wiring for the output is omitted here for the sake of the simplification of the figure. By the same token, the retaining circuit 110G disposed for the two pixel elements in the left side holds the data corresponding to the green image signal, and is connected to the drain signal line 61G1 through the TFT 42G. The output of the retaining circuit 110G is supplied to the pixel element electrodes 17G1 and 17G2 through the TFT 45G1 and 45G2. The retaining circuit 110B disposed for the two pixel elements in the right side holds the data corresponding to the blue image signal and is connected to the drain signal line 61B2 through the TFT42B. Also, the output of the retaining circuit 110B is supplied to the pixel element electrodes 17B1 and 17B2 through the TFT45B1 and 45B2 respectively.

The operation of this embodiment will be explained. First, under the normal operation mode, the image signal is supplied to the each of the six pixel elements from the drain signal line 61 connected through the each of the normal operation circuits 200 for operating two picture elements configured of six pixel elements. Next, under the memory operation mode, the retaining circuits 110R, G and B hold the signal fed from the drain signal lines 61R2, 61G1 and 61B2 and output the same signal to each of the two pixel element electrodes 17 connected through the TFT 45. Therefore, under the memory operation mode, the pixel elements shown in the figure is operated as one picture element configured of three pixel elements.

The operation of this embodiment is easily understood when it is compared with that of two aforementioned embodiments. That is, one retaining circuit 110 is disposed for every two pixel elements to be shared by the two pixel elements, which is the same as the second embodiment. However, in the second embodiment, the placement of the retaining circuit is confined to the area of the two connected pixel elements. In this embodiment, one of the two pixel elements, on the area of which the retaining circuit 110 is disposed, is the pixel element for different color. And the location of the retaining circuit 110 and that of the pixel element electrode 17, which receives the signal from the retaining circuit 110, differ from each other. For example, the retaining circuit 110R for R is superimposed on the pixel element electrodes 17B1 and 17R2, but the output of the retaining circuit is fed to the pixel element electrodes 17R1 and 17R2.

This configuration in the color display device described above allows the fine display under the normal operation mode by the use of each of the pixel elements. Also, under the memory operation mode, the two pixel elements, the pixel element electrodes 17R1 and 17R2 act as one pixel element. Therefore, in this embodiment, the retaining circuit 110 is shared by the two pixel elements, leading to the denser pixel element disposition as well as the size reduction. Additionally, the practical "number of the pixel elements" can be reduced under the memory operation mode, leading to the reduction of the energy consumption. The number of the SRAM operating under the memory mode is ½ of the number of pixel elements operating under the normal mode. Thus, the operation frequency of the drain driver 61 can be further reduced, which enable the further reduction of the energy consumption under the memory operation mode, compared to the first embodiment where one SRAM is disposed for every pixel element. When the operation mode changes from the normal to the memory, the display data should be written into all the retaining circuits 110, requiring a certain amount of electricity. If the number of the retaining circuits is relatively small, the electric energy required upon the transition from the normal to the memory operation mode can also be reduced.

In this embodiment, the pixel elements are placed in the order of R, G, B, but the retaining circuits 110 are placed in the order of G, R, B. Accordingly, it is possible to dispose the drain signal line 61 of each color and the retaining circuit for the same color adjacent to each other. If the retaining circuits 110 are placed in the same order of R, G, B as the order of the pixel elements, the retaining circuit R located in the left side and the retaining circuit 110B located in the right side can be connected to the drain wiring 61R1 and 61 B2 respectively. However, this means that the retaining circuit 110G in the center is placed between the drain signal lines 61B1 and 61R2. Thus, in order to connect the retaining circuit 110G to either the drain signal line 61G1 or 61G2, the wiring should extend over either the drain signal line 61B1 or 61R2. But, if the order of the disposition of the retaining circuits is G, R, B as in this embodiment, all the retaining circuits 110 are superimposed on the two pixel elements, one of which belongs to the same color as the retaining circuit 110. And also, since the drain signal line 61 for the same color is disposed adjacent to the retaining circuit, there is no need for the wiring that extends over the drain signal line. The order of the disposition of the retaining circuits 110 can also be R, B, and G.

Also in this embodiment, the circuit disposition of the normal operation circuits 200 of the adjacent pixel elements is symmetry with the axis. That is, the normal operation circuit 200a connected to the pixel element electrode 17R1 and the normal operation circuit 200b connected to the pixel element electrode 17G1 have the same circuit configuration and are disposed symmetrically with the axis of the symmetry between columns of the pixel elements. For example, the drain signal line is not placed between the pixel element electrodes 17R1 and 17G1, but the two drain signal lines 61G1 and 61B1 are placed between the pixel element electrodes 17G1 and 17B1. In this embodiment, it is also possible to place the drain signal line 61 between pixel element electrodes, as shown in FIG. 4 for the second embodiment. However, each of the configurations has both an advantage and a disadvantage. For example, if the retaining circuit 110 and the drain signal line 61 intersect, the false operation of the retaining circuit 110 might occur due to the electric field generated from the drain signal line 61. However, the configuration shown in the FIG. 6 can prevent the crossing over of the retaining circuit 110 and the drain signal line 61 as well as the false operation of the retaining circuit 110. On the other hand, since the drain signal lines 61G1 and 61B1 are disposed adjacent to each other in this disposition, there is a possibility of the coupling between them. Therefore, an adequate space between wiring is necessary. However, if the drain signal line is disposed between the pixel elements as shown in FIG. 4, there is no possibility for coupling. These advantages and disadvantages offset each other. The layout design and the adjustment of the film thickness can solve the disadvantages. Thus the selection of the layout is totally left to one's discretion.

Figure 7:
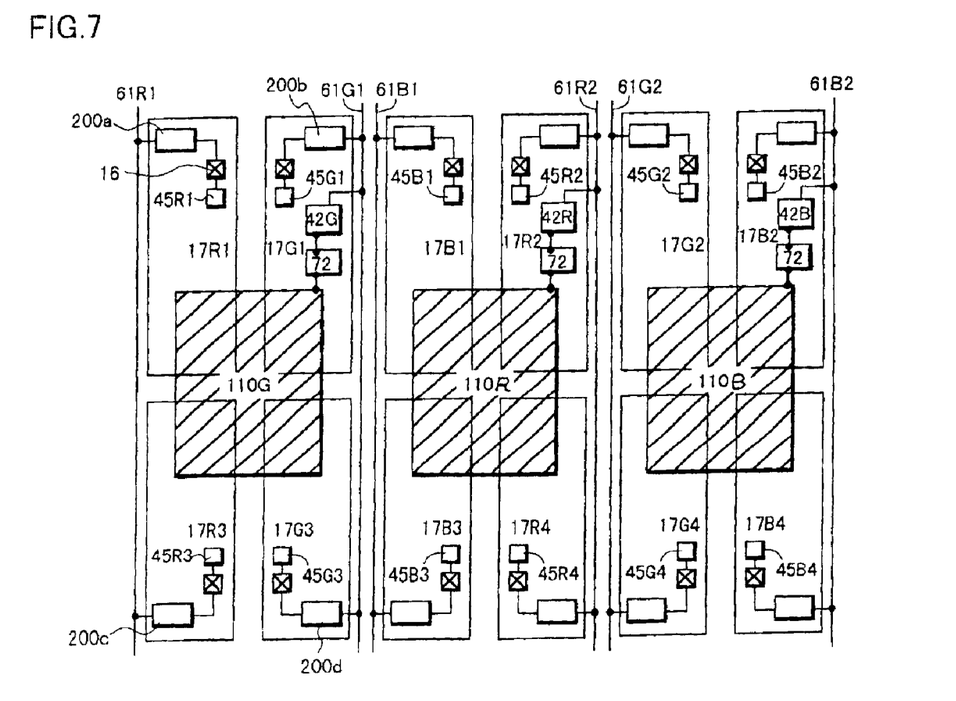
FIG. 7 is a schematic view showing the plan layout of the fifth embodiment of this invention.

Next, the fifth embodiment of this invention will be explained. FIG. 7 shows the schematic view of this invention. This embodiment is also for the color display device. In FIG. 7, four picture elements and twelve pixel elements are shown. When the differentiation between the picture element and pixel elements is especially needed, the combination of R, G, and B for denoting the color and the numbering from 1 to 12 will be put after the reference numerals of the figure, hereinafter. As in the forth embodiment, the normal operation circuit 200 that operates under the normal operation mode is disposed for each of the pixel elements. Under the normal operation mode, each of the pixel elements operates as in the aforementioned embodiments.

Each of the retaining circuits 110R, 110G and 110B is disposed to be shared by the four pixel elements. The retaining circuit 110R placed for the four pixel elements in the center is connected to the drain signal line 61R2 through TFT 42R. The output of the retaining circuit 110R is supplied to the two rows of four pixel element electrodes 17R1, 17R2, 17R3 and 17R4 at the left edge and the center of the figure through the TFTs 45R1, 45R2, 45R3 and 45R4 respectively. However, the depiction of the wiring is omitted in the figure for the sake of the simplification of the figure. Likewise, the output of the retaining circuits 110G and 110B is applied to each of the four pixel element electrodes.

The operation of this embodiment is explained. First, under the normal operation mode, the image signal is supplied to each of the six pixel element electrodes from each of the drain signal lines 61 through the normal operation circuits 200 for operating the four picture elements configured from the twelve pixel elements. Next, under the memory operation mode, the retaining circuits 110R, G, and B hold the signals fed from the drain signal lines 61R2, 61G1 and 61B2 and output the same signal to each of the four pixel elements. Therefore, the pixel elements seen in the figure act as one picture element and three pixel elements.

The operation of this embodiment is easily understood when it is compared with that of the third embodiment. That is, one retaining circuit 110 is disposed for and shared by four pixel elements, which is the same as the third embodiment. In this embodiment, however, the retaining circuit 110R is placed for the pixel element electrodes 17B1, B3, R2 and R4 but generates the output to the pixel element electrodes 17R1, R2, R3 and R4. The difference between this embodiment and the forth embodiment is the same difference between the second embodiment and the third embodiment. That is, the configuration of the normal operation circuits 200c, 200d in the second row is the same as that of the normal operation circuits 200a and 200b in the first row. And they are symmetrically disposed with the axis between their rows. This reserves the space for the retaining circuit 110 in the center of the four pixel elements.

Also in this embodiment, under the normal operation mode, display is made for each of the pixel elements. Under the memory operation mode, display is made by making four pixel elements act as one pixel element, reducing the seeming number of the pixel elements. In this embodiment, the number of the retaining circuit disposed for each of the pixel element electrodes is about ¼, and thus, the area required for the retaining circuit per one pixel element is relatively small. Therefore, compared to the second embodiment, the circuit configuration can be made higher, leading to the further size reduction. And, it is possible to supply a fine display under the normal operation mode, and to provide a display with low energy consumption under the memory operation mode. Also, the number of the SRAM operating under the memory operation mode is about ¼ of the number of pixel elements operating under the normal operation mode. It is also possible to reduce the operation frequency of the drain driver 60 as well as the operation frequency of the gate driver 50 as in the third embodiment. Therefore, the energy consumption during the transition from normal to memory operation mode and the energy consumption under the memory operation mode can be further reduced compared to the forth embodiment.

Next, the sixth embodiment will be explained. For from the first to the fifth embodiments, the explanation is made based on the assumption that the retaining circuit 110 is 1 bit SRAM for storing 2-value memory. However, this invention is applicable to the device with an analog memory that is capable of holding more than three-value memory such as multiple-bit memory and analog value, making this invention more effective. The active matrix display device shown in the FIG. 8, has two-bit memory capable of storing four-value memory as the retaining circuit. The two-bit memory is configured from the combination of two SRAMs, and the four-value reference voltages of signals A, B, C and D, which are different from each other, are inputted. As to the drain signal line 61, two lines 61 a and 61b are disposed for each of the pixel elements.

Figure 8:
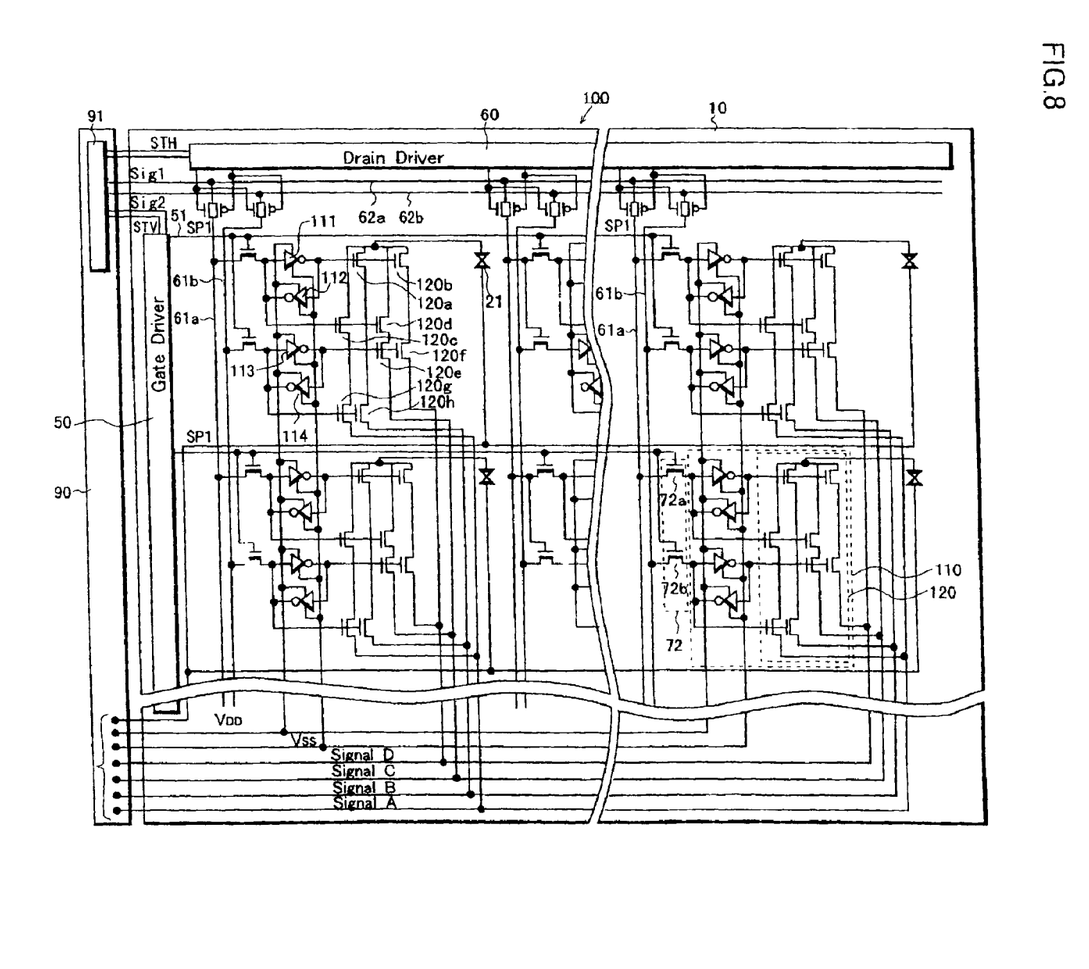
FIG. 8 is a schematic view showing the plan layout of the sixth embodiment of this invention.

When the drain signal lines 61a and 61b are high, the inverter circuits 111 and 113 output the low to the transistors 120a, b, e and f, turning them off. And the inverter circuits 112 and 114 output the high to the transistors 120c, 120d, 120g, and 120h, turning them on.

This supplies the signal A to the liquid crystal 21 through the transistor 120c and g. In the same manner, when the drain signal line 61a is high and 61b is low, the transistor 120d and e are on supplying the signal C to the liquid crystal 21. When the drain signal line 61 a is low and 61b is high, the transistors 120a and h are on, supplying the signal B to the liquid crystal 21. When both of the drain signal line 61a and 61b are low, the transistor 120b and f are on, supplying the signal D to the liquid crystal 21.

Selecting and supplying the signals A, B, C, and D to the liquid crystal 21 based on the four-value data held in the retaining circuit 110 can acquire the four-depth images. The depiction of the normal operation circuit 200 is omitted in the FIG. 8 for the sake of simplification on the figure. However, the layout is completely the same as those shown in FIGS. 2, 4, 5, 6, and 7, and it is disposed for a plurality of the pixel elements, leading to the size reduction as well as the low energy consumption.

As it is obvious from the comparison between FIG. 1 and FIG. 8, the multivalent retaining circuit 110 makes the scale of the circuit larger, in general. However, when four pixel elements share one retaining circuit 110, the size reduction of the pixel element and the fine display under the normal operation mode are possible. That a plurality of pixel elements shares the retaining circuit 110, which requires larger circuit area, is the feature of this invention. This invention can be more effectively applied to the multiple-value retaining circuit 110, which has a larger circuit scale.

Also, as it is obvious from the comparison between the aforementioned embodiments, the number of the pixel elements sharing one retaining circuit 110 is left to one's discretion. The greater the number of the pixel elements to share one retaining circuit 110, the smaller the area for the retaining circuit 110 per pixel element, leading to the higher circuit integration as well as the finer display under the normal operation mode. Also, the greater the number of the pixel elements to share one retaining circuit 110, the smaller the number of the retaining circuits 110 to be operated under the memory operation mode, leading to the reduction of the energy consumption under the memory operation mode. However, the smaller the number of the retaining circuits 110, the smaller "the number of the pixel elements" operated for display under the memory operation mode, leading to the lowered quality of the display under the memory operation mode. Thus, a decision about the number of the pixel elements to share one retaining circuit 110 must be made based on the comparison among the display quality under normal and memory operation modes and the required energy consumption. However, when the three pixel elements aligned in the row direction share one retaining circuit 110, the space for the retaining circuit becomes oblong in row direction. Thus, it is more appropriate to dispose one retaining circuit 110 for every two or four pixel elements.

In the aforementioned embodiments, one retaining circuit 110 is disposed for a plurality of pixel elements and the output of the retaining circuit 110 is applied to a plurality of pixel element electrodes 17, making the reduction of the seeming number of the pixel elements under the memory operation mode. But, it is also possible to apply the output of the retaining circuit 110 to one pixel element electrode 17 and fix the remaining pixel element electrodes in black display by applying a certain voltage (in case of normally black, fix the remaining pixel element electrodes in black by earthing). Thus, the only necessary wiring is from the retaining circuit 110 to one pixel element electrode for supplying the output, leading to the omission of the wiring to the remaining pixel element electrodes. This allows the further reduction of the circuit space as well as the finer display under the normal operation mode. Needless to say, the pixel elements fixed in black display make the displayed image darker. However, the memory operation mode is the mode for reducing the energy consumption when there is no scanning for a certain amount of time in the display device such as mobile telephone. Thus, in many cases, there is no problem if the display image is darker under the memory operation mode. The reduction of the real number of the pixel elements under display enables the device to operate even with the lower driving ability of the signal A outputted from the retaining circuit 110, leading to the further reduction of the energy consumption.

Also in the aforementioned embodiments, it is explained that at least one of the pixel element electrodes 17, the placement of which is superimposed with the placement of the retaining circuit 110, should be connected to that retaining circuit. However, the disposition of the retaining circuit does not necessarily coincide with the disposition of the pixel element electrode 17. However, when the retaining circuit 110 and the pixel element electrode 17 are placed far from each other, the longer wiring is required, making the layout difficult, and leading to the possible noise pick-ups by the wiring. Thus it is more adequate that at least one of the pixel element electrodes 17, the placement of which is superimposed with the placement of the retaining circuit 110, should be connected to that retaining circuit.

In the aforementioned embodiments, the reflection type LCD is used. But, this invention is applicable to the transmitting type LCD as well. It is possible to superimpose the transparent pixel element electrode on the retaining circuit. However, in the transmitting type LCD, the light is blocked by the metal wiring, and thus, the reduction of the light manipulation area is inevitable. Also, when the retaining circuit is disposed under the pixel element electrode in the transmitting type LCD, the transmitted light may cause the false-operation of the transistor in the retaining circuit and the selection circuit. Thus, it requires the deposition of the light blocking film on the gates of all the transistors. Therefore, it is difficult to increase the light manipulation area in the transmitting type LCD. On the other hand, the light manipulation area of the reflection type LCD is not influenced by the placement of the circuit under the pixel element electrode. Additionally, in the reflection type LCD, there is no need to use a back light on the opposite side of the observer as in the transmitting type liquid crystal display device, meaning that there is no need for the electricity for generating the back light. The original purpose of the LCD with the retaining circuit is to reduce the energy consumption, and thus, this invention is more appropriate to be applied to the reflection type LCD that requires no back light and that is suitable for the reduction of the energy consumption.

Also in the aforementioned embodiments, the explanation was made by using liquid crystal display device. But this invention is not limited to that application. It is also applicable to variety of devices such as organic EL display device and LED display device.

As explained above, in the active matrix display device of this invention, one retaining circuit is disposed for a plurality of, for example, two or four pixel elements. And the output from one retaining circuit is applied to a plurality of pixel elements. Since the number of the retaining circuit that requires considerable circuit space can be reduces, the higher integration of the pixel element electrodes is possible, leading to the finer display under the normal operation mode.

Also, the number of the pixel elements used for the display under the memory mode is smaller than the number of the pixel elements used for the display under the normal operation mode. Thus, the number of the retaining circuits operated under the memory mode is small, leading to the reduction of the energy consumption upon the transition from the normal to memory operation mode as well as under the memory operation mode.

Furthermore, the retaining circuit is a multiple-bit memory that is capable of storing more than two-value memory, and thus the circuit scale is considerably large, making the application of this invention more efficient.

What is claimed is:

1. An active matrix display device comprising:
   a plurality of pixel element electrodes disposed in a matrix configuration; and
   a plurality of retaining circuits provided for the pixel element electrodes,
   wherein the active matrix display device operates under two operation modes, one of said operation modes being a normal operation mode in which the pixel element electrode receives a pixel element voltage in response to an inputted image signal for presenting an analog image, another of said operation modes being a memory operation mode in which a digital image is presented based on a voltage held by the retaining circuit, and
   wherein at least one of the retaining circuits is provided as a common retaining circuit for two or more of the pixel element electrodes so that an output of the common retaining circuit is shared by said two or more of the pixel element electrodes, and each of said two or more of the pixel element electrodes is connected to only one signal line.

2. The active matrix display device of claim 1, wherein the common retaining circuit is provided for every two pixel element electrodes and the output of the common retaining circuit is shared by said every two pixel element electrodes.

3. The active matrix display device of claim 1, wherein the common retaining circuit is provided for every four pixel element electrodes and the output of the common retaining circuit is shared by said every four pixel element electrodes.

4. An active matrix display device comprising:

a plurality of pixel element electrodes disposed in a matrix configuration; and a plurality of retaining circuits provided for the pixel element electrodes, wherein the active matrix display device operates under two operation modes, one of said operation modes being a normal operation mode in which the pixel element electrode receives a pixel element voltage in response to an inputted image signal for presenting an analog image, another of said operation modes being a memory operation mode in which a digital image is presented based on a voltage held by the retaining circuit, and wherein at least one of the retaining circuits is provided as a common retaining circuit for two or more of the pixel element electrodes so that an output of the common retaining circuit is applied to all of said two or more of the pixel element electrodes at the same time.

5. The active matrix display device of claim 4, wherein the number of the retaining circuits is a half of the number of the pixel element electrodes.

6. The active matrix display device of claim 4, wherein the number of the retaining circuits is one fourth of the number of the pixel element electrodes.

7. The active matrix display device of claim 4, wherein the number of pixel elements for display under the memory operation mode is a half of the number of pixel elements for display under the normal operation mode.

8. The active matrix display device of claim 4, wherein the number of pixel elements for display under the memory operation mode is one fourth of the number of pixel elements for display under the normal operation mode.

9. The active matrix display device of claim 1, 2, 3, 4, 5, 6, 7 or 8, wherein the retaining circuit is a multiple-bit memory holding voltages of three or more values.

* * * * *